(12) United States Patent
Paek et al.

(10) Patent No.: US 6,279,354 B1
(45) Date of Patent: Aug. 28, 2001

(54) COOLER OF OPTICAL FIBER DRAW TOWER

(75) Inventors: Un-Chul Paek; Sung-Koog Oh, both of Kwangju; Man-Seok Seo, Suwon; Kyu-Hwan Hwang, Daegu, all of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/229,609

(22) Filed: Jan. 13, 1999

(30) Foreign Application Priority Data

Jan. 13, 1998 (KR) .................................................... 98-700

(51) Int. Cl.[7] ..................................................... C03B 5/44
(52) U.S. Cl. .................................. 65/510; 65/511; 65/512; 65/481; 65/381; 62/3.2; 62/3.7; 62/3.3; 165/104.11
(58) Field of Search .............................. 65/510, 511, 512, 65/481, 381; 62/3.2, 3.7, 3.3; 165/104.11

(56) References Cited

U.S. PATENT DOCUMENTS 5,366,527 * 11/1994 Amos ...................................... 65/382
5,737,923 * 4/1998 Gilley ...................................... 62/3.7

* cited by examiner

*Primary Examiner*—Stanley S. Silverman
*Assistant Examiner*—Mark Halpern
(74) *Attorney, Agent, or Firm*—Robert E. Bushnell, Esq.

(57) ABSTRACT

A cooler of an optical fiber draw tower, situated below a melting furnace for melting a preform for an optical fiber, for cooling the optical fiber drawn from the preform melted in the melting furnace, includes at least one heat exchanger installed with a predetermined length surrounding the optical fiber drawn from the melting furnace, for cooling the drawn optical fiber. The heat exchanger is formed of a thermoelectric cooler (TEC) for taking electrical energy through one heat absorbing surface to emit heat to the other heat emitting surface and has a tubular shape in which the heat absorbing surface of the TEC surrounds the optical fiber drawn from the melting furnace along the drawing direction by a predetermined length, and the drawn optical fiber is cooled as it passes through the tubular TEC. Also, the cooler further includes an auxiliary cooler attached to the heat emitting surface of the TEC, for cooling the emitted heat. Therefore, the cooler can enhance the cooling effect, so that the drawing of the optical fiber can be sped up without increasing the height of the optical fiber draw tower.

25 Claims, 9 Drawing Sheets

COOLER OF OPTICAL FIBER DRAW TOWER

CLAIM OF PRIORITY

This application makes reference to, incorporates the same herein, and claims all benefits accruing under 35 U.S.C. §119 from an application entitled Cooler of Optical Fiber Draw Tower earlier filed in the Korean Industrial Property Office on Jan. 13, 1998, and there duly assigned Serial No. 98-700 by that Office.

BACKGROUND OF THE INVENTION

1. Field of the Invention

The present invention relates to an optical fiber draw tower, and more particularly, to a cooler of an optical fiber draw tower.

2. Description of the Related Art

In general, optical fibers are obtained by drawing a preform for optical fibers using an optical fiber draw tower. A general optical fiber draw tower includes a melting furnace for melting a preform at a high temperature to draw out uncoated optical fiber, a diameter measuring unit installed below the melting furnace for continuously measuring the outer diameter of the uncoated optical fiber to uniformly control the outer diameter of the uncoated optical fiber, a cooling unit below the diameter measuring unit, for cooling down the temperature of the uncoated optical fiber to room temperature, a coating unit below the cooling unit, for coating the surface of the uncoated optical fiber with UV-curable resin such as acryl resin or silicon resin so as to protect the uncoated optical fiber from the elements of nature, a curing unit below the coating unit, for curing the coated optical fiber, a capstan below the curing unit, for drawing out an optical fiber from the preform in a lower direction, and a spool next to the capstan, for winding the drawn optical fiber.

A method for preparing (drawing) an optical fiber coated with the UV-curable resin will be described. The preform is slowly provided into the melting furnace according to the position control mechanism of a preform position controller (not shown). Here, the preform is heated in the melting furnace to several thousands of degrees centigrade, typically, to 2,100~2,200° C. As a result, the uncoated optical fiber is drawn from the preform. Here, the drawing force originates from the capstan and is applied to the uncoated optical fiber.

Then, the diameter measuring unit measures the outer diameter of the uncoated optical fiber drawn to determine whether the diameter is equal to a predetermined diameter, e.g., 125 pm, and sends the measured diameter values to a diameter controller (not shown). The diameter controller controls the rotating speed of the capstan such that the diameter of the uncoated optical fiber is maintained at 125 pm. Then, the capstan rotates to control the drawing force on the uncoated optical fiber in response to the control of the diameter controller, thereby drawing out the uncoated optical fiber in a downward direction.

Then, in order to protect the uncoated optical fiber cooled at high speed by the cooling unit, the coating unit coats the surface of the descending uncoated optical fiber with a UV-curable resin, e.g., acryl resin or silicon resin. Then, the optical fiber coated with the UV-curable resin is cured by the curing unit, and is then wound around the spool under the control of drawing force of the capstan.

Also, if the preform is large, the height of the optical fiber draw tower must be increased. This is because very rapid drawing is necessary as the preform becomes large. After the preform is melted passing through a melting furnace and then drawn out, the drawn optical fiber is subjected to coating. Here, prior to coating of the optical fiber, the temperature of the uncoated optical fiber it must be lowered to a predetermined temperature. In general, the temperature of the uncoated optical fiber drawn right from the melting furnace is 2,000° C. or more, However, in order to guarantee stable coating on the drawn optical fiber, the temperature of the uncoated optical fiber must be cooled to at least 40° C. or less (usually to room temperature). For this purpose, the temperature of the uncoated optical fiber is cooled rapidly using a cooler. However, coolers in use are not sufficient to cool the uncoated optical fiber to keep pace with the rapid drawing speed. In the cooler having a pipe shape, the drawn optical fiber is cooled by filling the pipe with helium (He).

Thus, it is necessary to increase the height of the optical fiber draw tower in order to quickly cool the uncoated optical fiber in response to the rapid drawing speed of the optical fiber, However, making the optical fiber draw tower high increases the manufacturing cost and it is not efficient. What is needed is an efficient cooler not requiring a high optical fiber draw tower.

SUMMARY OF THE INVENTION

It is therefore an object of the present invention to provide an improved cooling unit for an optical fiber draw tower.

It is a further object of the invention to provide a cooler for an optical fiber draw tower which provides more efficient cooling.

It is a yet further object of the invention to provide a cooler which allows for a more rapid draw speed of the optical fiber.

It is a still further object of the invention to provide a cooler which allows for a shorter draw tower.

To achieve the above objects, the present invention provides a cooler of an optical fiber draw tower, capable of rapidly cooling an optical fiber which is melted in a melting furnace and then drawn, without increasing the height of a conventional optical fiber draw tower, such that the optical fiber can be rapidly drawn out from a preform. According to an aspect of the object of the present invention, there is provided a cooler of an optical fiber draw tower, situated below a melting furnace for melting a preform for an optical fiber, for cooling the optical fiber drawn from the preform melted in the melting furnace, wherein the cooler includes at least one heat exchanger installed with a predetermined length surrounding the optical fiber drawn from the melting furnace, for cooling the drawn optical fiber.

Preferably, the heat exchanger is formed of a thermoelectric cooler (TEC) for taking electrical energy through one heat absorbing surface to emit heat to the other heat emitting surface and has a tubular shape in which the heat absorbing surface of the TEC surrounds the optical fiber drawn from the melting furnace along the drawing direction by a predetermined length, and the drawn optical fiber is cooled as it passes through the tubular TEC.

Preferably, the cooler further includes an auxiliary cooler attached to the heat emitting surface of the TEC, for cooling the emitted heat, and the auxiliary cooler is installed contacting the heat exchanger and includes a tank in which is a heat-exchange medium flow path is arranged, a supply pipe attached to the tank to supply a heat-exchange medium through the heat-exchange medium flowing path, and an return pipe for returning the heat exchange medium.

According to another aspect of the object, there is provided a cooler of an optical fiber draw tower, situated below a melting furnace for melting a preform for an optical fiber, for cooling the optical fiber drawn from the preform melted in the melting furnace, wherein the cooler has a shape having two openings through which the drawn optical fiber passes in the vertical direction, and includes two thermoelectric coolers (TECs) each having one heat absorbing surface for taking electrical energy and the other heat emitting surface for emitting heat, arranged such that two heat absorbing surfaces face each other, surrounding the drawn optical fiber, and two spacers interposed between the TECs to surround the drawn optical fiber.

Preferably, the cooler further includes an auxiliary cooler attached to each heat emitting surface of the facing TECs. Also, at least two coolers may be arranged in the optical fiber drawing direction. Preferably, each cooler further includes an auxiliary cooler attached to each heat emitting surface of the facing TECs, and an insulating material is interposed between the coolers.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
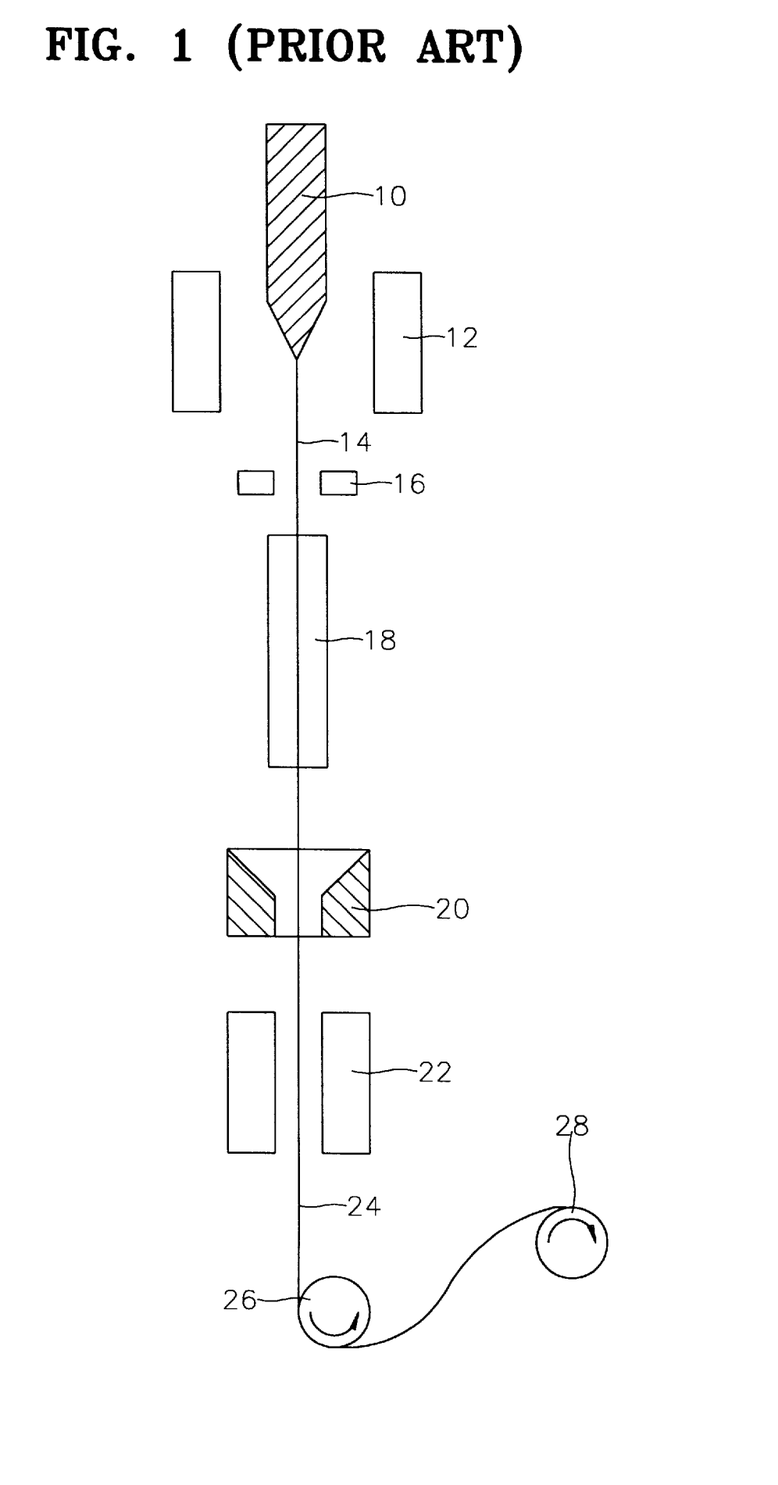
FIG. 1 is a schematic view of a general optical fiber draw tower.

In general, optical fibers are obtained by drawing a preform for optical fibers using an optical fiber draw tower. Turning now to the drawings, FIG. 1 is a schematic view of the general optical fiber draw tower discussed above. The optical fiber draw tower includes melting furnace 12 for melting preform 10 at a high temperature to draw out uncoated optical fiber 14, diameter measuring unit 16 installed below melting furnace 12, for continuously measuring the outer diameter of the uncoated optical fiber to uniformly control the outer diameter of the uncoated optical fiber, cooling unit 18 below diameter measuring unit 16, for cooling down the temperature of uncoated optical fiber 14 to room temperature, coating unit 20 below cooling unit 18, for coating the surface of the uncoated optical fiber with UV-curable resin such as acryl resin or silicon resin so as to protect the uncoated optical fiber 14 from the elements of nature, curing unit 22 below coating unit 20, for curing coated optical fiber 24, capstan 26 below curing unit 22, for drawing out an optical fiber from preform 10 in a lower direction, and spool 28 next to capstan 26, for winding the drawn optical fiber.

A method for preparing (drawing) an optical fiber coated with the UV-curable resin will be described. Preform 10 is slowly provided into melting furnace 12 according to the position control mechanism of a preform position controller (not shown). Here, preform 10 is heated in melting furnace 12 to several thousands of degrees centigrade, typically, to 2,100–2,200° C. As a result, uncoated optical fiber 14 is drawn from preform 10. Here, drawing force originates from capstan 26 and is applied to uncoated optical fiber 14.

Then, diameter measuring unit 16 measures the outer diameter of uncoated optical fiber 14 drawn to determine whether the diameter is equal to a predetermined diameter, e.g., 125 pm, and sends the measured diameter values to a diameter controller (not shown). The diameter controller controls the rotating speed of capstan 26 such that the diameter of uncoated optical fiber 14 is maintained at 125 pm. Then, capstan 26 rotates to control the drawing force on uncoated optical fiber 14 in response to the control of the diameter controller, thereby drawing out uncoated optical fiber 14 in a lower direction.

Then, in order to protect uncoated optical fiber 14 cooled at high speed by cooling unit 18, coating unit 20 coats the surface of the descending uncoated optical fiber 14 with a UV-curable resin, e.g., acryl resin or silicon resin. Then, optical fiber 24 coated with the UV-curable resin is cured by curing unit 22, and is then wound around spool 26 under the control of drawing force of capstan 26.

Figure 2:
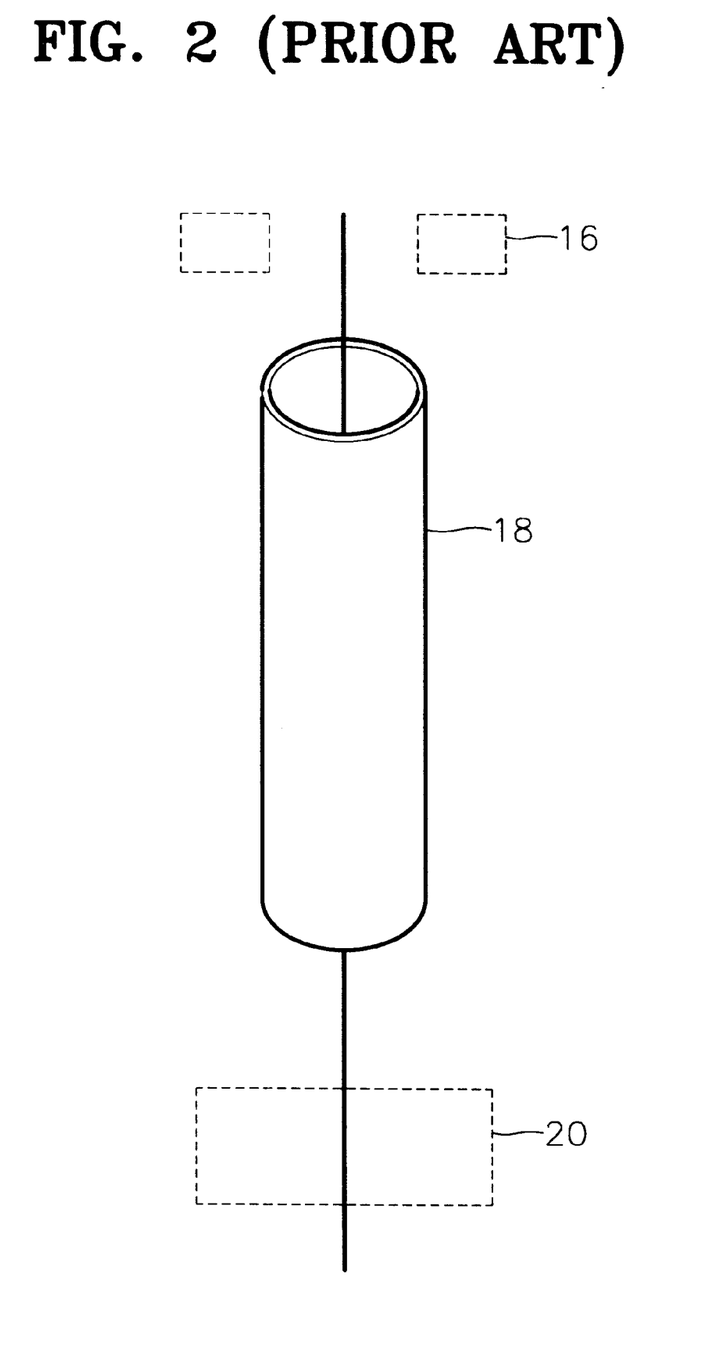
FIG. 2 shows a general cooler adopted in the optical fiber draw tower shown in FIG. 1.

Also, if the preform is large, the height of the optical fiber draw tower must be increased. This is because very rapid drawing is necessary as the preform becomes large. After the preform is melted passing through a melting furnace and then drawn out, the drawn optical fiber is subjected to coating. Here, prior to coating of the optical fiber, the temperature of the uncoated optical fiber must be lowered to a predetermined temperature. In general, the temperature of the uncoated optical fiber drawn right from the melting furnace is 2,000° C. or more, However, in order to guarantee stable coating on the drawn optical fiber, the temperature of the uncoated optical fiber must be cooled to at least 40° C. or less (usually to room temperature). For this purpose, the temperature of the uncoated optical fiber is cooled rapidly using a cooler. However, coolers in use are not sufficient to cool the uncoated optical fiber to keep pace with the rapid drawing speed. FIG. 2 shows a general cooler adopted by the optical fiber draw tower shown in FIG. 1. In the cooler having a pipe shape, the drawn optical fiber is cooled by filling the pipe with helium (He).

Figure 5:
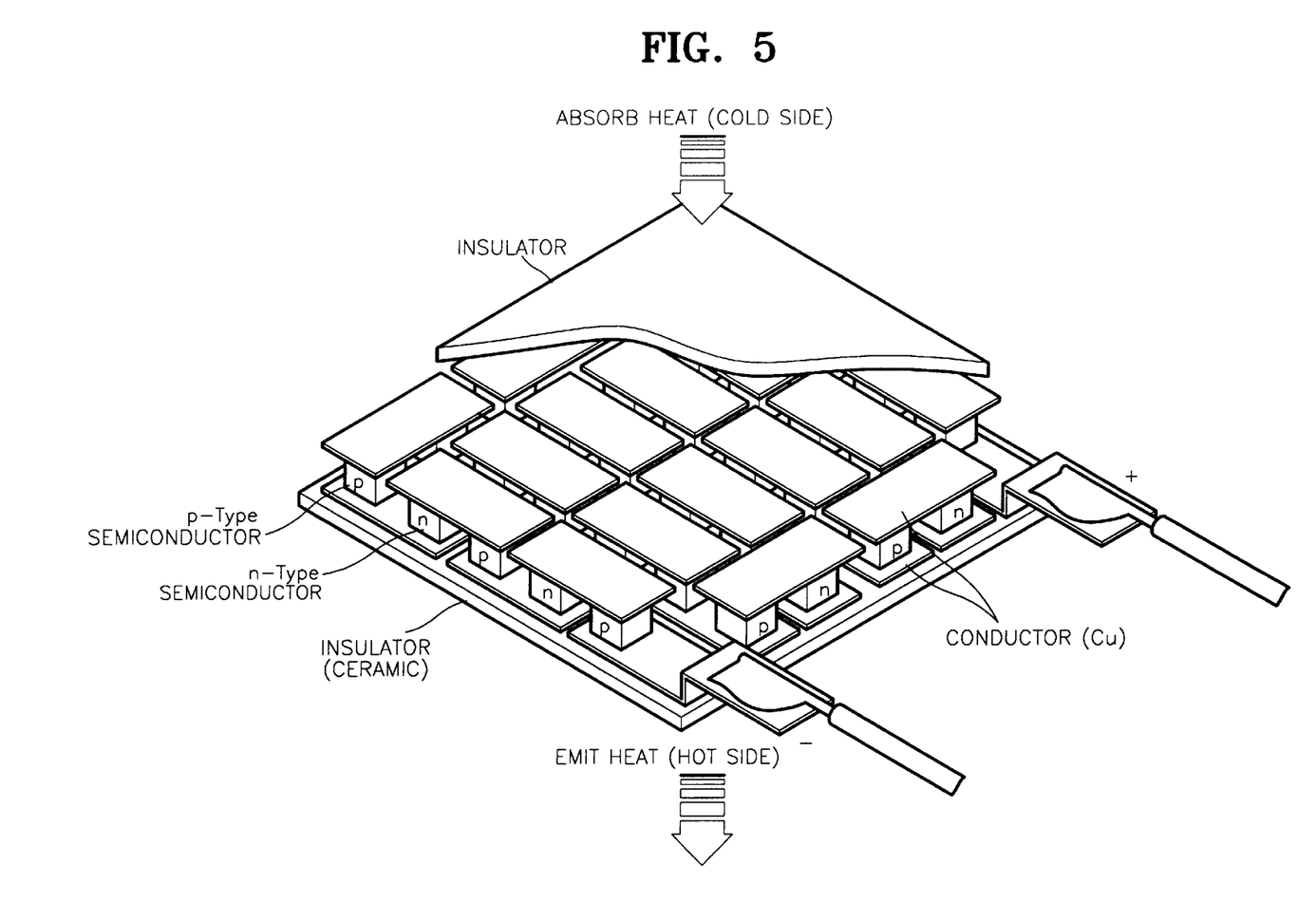
FIG. 5 shows the structure of an example of the TEC.

The present invention will now be described with reference to the drawings. The Peltier effect refers to the change in temperature when current flows across two different materials contacting each other. A small solid state device, such as a heat pump, based on the Peltier effect, is called a "thermoelectric cooler (TEC)". FIG. 5 shows an example of the TEC, in which p-type and n-type semiconductor pairs are arranged in series between two ceramic plates.

The basic concept of the present invention is to provide a cooler for an optical fiber draw tower which uses the TEC.

Figure 3:
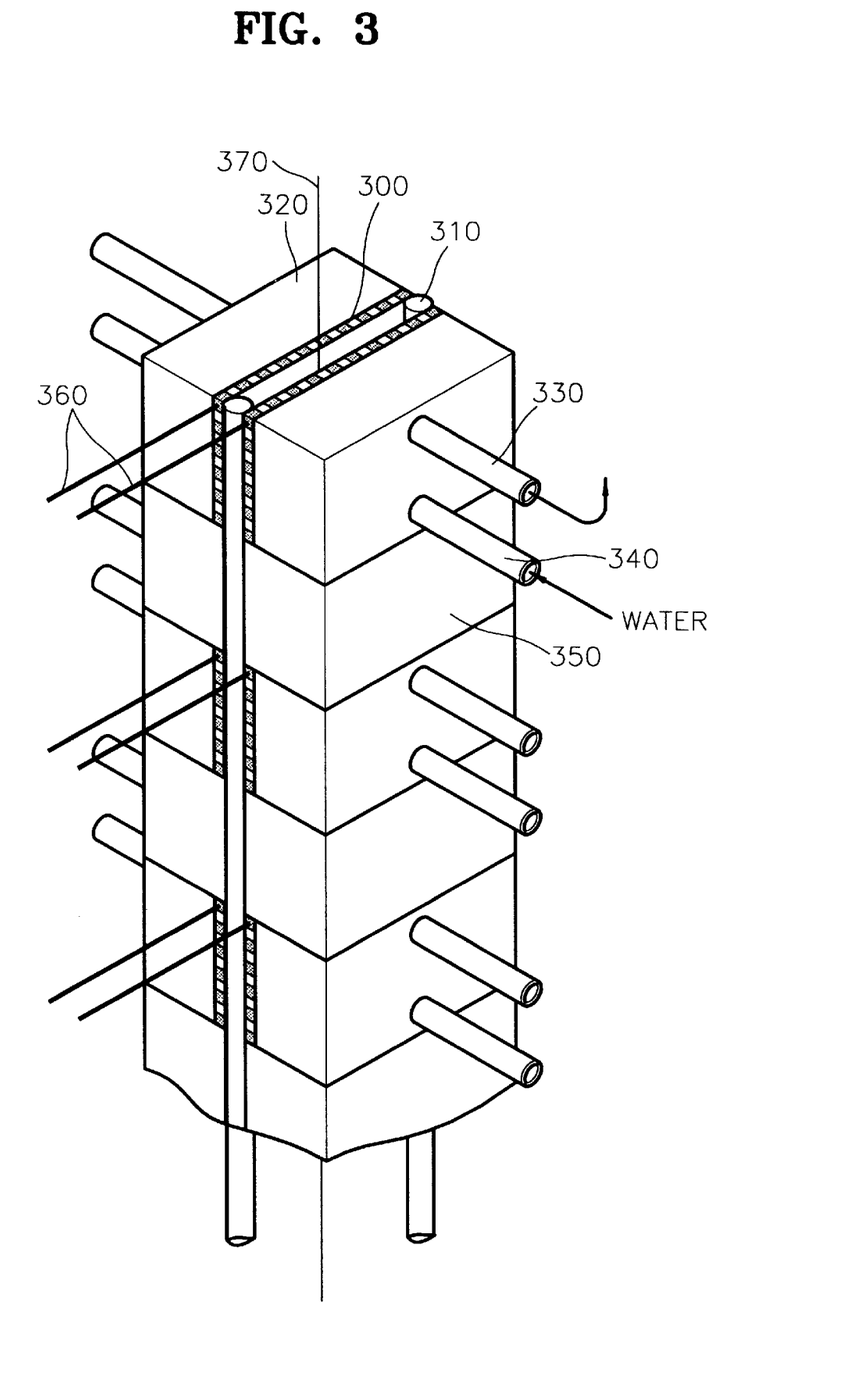
FIG. 3 shows a cooler of an optical power draw tower according to a preferred embodiment of the present invention, which adapts a thermoelectric cooler (TEC) and doubles the cooling effect.
Figure 4:
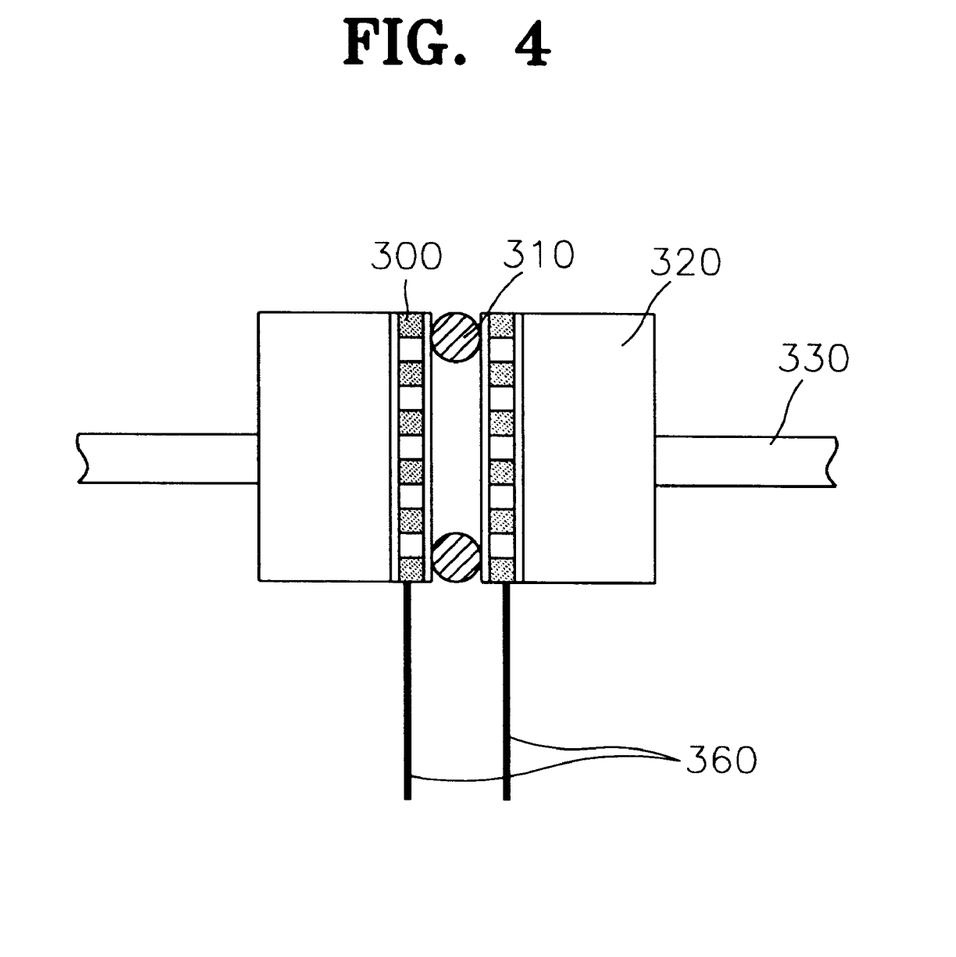
FIG. 4 is a top view of the cooler shown in FIG. 3.

FIG. 3 shows a cooler of an optical fiber draw tower according to the present invention, which adopts the TEC to double the cooling effect. The basic module includes two TECs 300, two rods 310, and an auxiliary cooler consisting of three units 320, 330 and 340 which is attached to each heat-emitting surface of the TECs 300. FIG. 4 is a top view of the cooler a shown in FIG. 3. The cooler shown in FIG. 3 is constituted of two or more basic modules connected to each other, and insulating material 350 interposed between the basic modules. Here, the height of the cooler can be controlled by the number of basic modules adopted.

The TEC 300 is a heat exchanger for generating heat by taking electrical energy through power supply lines 360. The TEC is installed to surround the optical fiber drawn from the melting furnace 12 of FIG. 1. That is, TECs 300 are arranged so that their heat absorbing surfaces face each other around the optical fiber drawn from melting furnace 12. Also, fins may be attached so as to enhance the cooling effect at the heat absorbing surfaces of TECs 300. Also, rods 310 act as a spacer for separating the facing TECs 300 by a predetermined interval.

Optical fiber 370 passes through the space enclosed by two TECs 300 and two rods 310 in the vertical direction, and a coolant is supplied to the space to further lower the temperature of optical fiber 370. The coolant may be helium (He), argon (Ar) or nitrogen (N). In this embodiment, He or Ar is used as the coolant.

Here, the three units constituting the auxiliary cooler which adopts a water cooling system are tank 320 in which a heat exchange medium flowing path is formed, supply pipe 340 attached to tank 320, for supplying the heat exchange medium through the heat exchange medium flowing path to tank 320, and return pipe 330 for returning the heat exchange medium. In this embodiment, water is used as the heat exchange medium. However, any medium capable of exchanging heat, e.g., oil, may be used in some cases, Also, fins maybe attached to tank 320 to enhance its cooling effect. An auxiliary cooler adopting an air cooling system, in which air is supplied using a fan for cooling, may be used. That is, the cooling system adopted by the auxiliary cooler is not limited to the above embodiment according to the present invention.

Insulating material 350 blocks the heat transfer from an upper basic module to a lower basic module, thereby enhancing the cooling efficiency of each basic module of the cooler. Insulating material 350 used in this embodiment is styrofoam. However, the insulating material is not limited to a specific material.

The cooler illustrated in this embodiment has a hexahedral shape, and uncoated optical fiber 370 drawn from a melting furnace is surrounded using two TECs 300 and two rods 310, Preferably, two TECs are used in place of two rods 310, More preferably, the cooler is formed using a tubular TEC. That is, the cooler can be modified into various shapes without limitations. Also, the number of basic modules adopted by the cooler may be different, That is, in the case where the length of the TEC is sufficient to cool the uncoated optical fiber drawn from the melting furnace keeping pace with the drawing speed, the cooler may be constituted of only one basic module.

Figure 6:
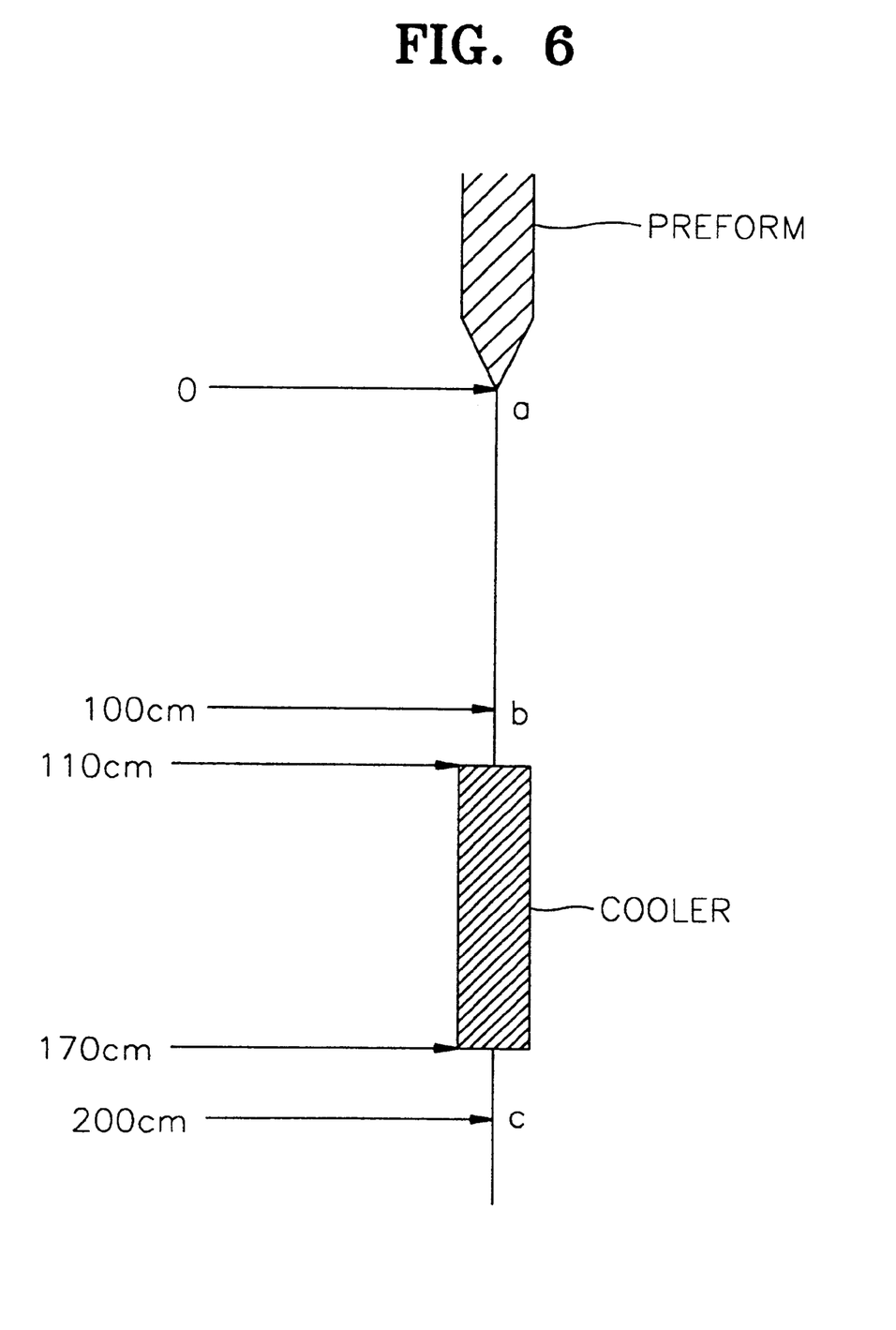
FIG. 6 shows positions a, b and c at which temperatures are measured to illustrate the cooling effect according to distance from the preform.

FIG. 6 shows positions a, b and c at which temperatures are measured to illustrate the cooling effect according to distance from the preform, Reference character a indicates the bottom line of the preform, and reference characters b and c indicate the positions separated from the bottom line a by 100 cm and 200 cm, respectively. Here, the cooler is located between the positions b and c. Also, T. indicates the temperature of the preform, and $T_1$ and $T_2$ indicate the temperatures of the drawn optical fiber at the positions b and c, respectively.

Figure 7:
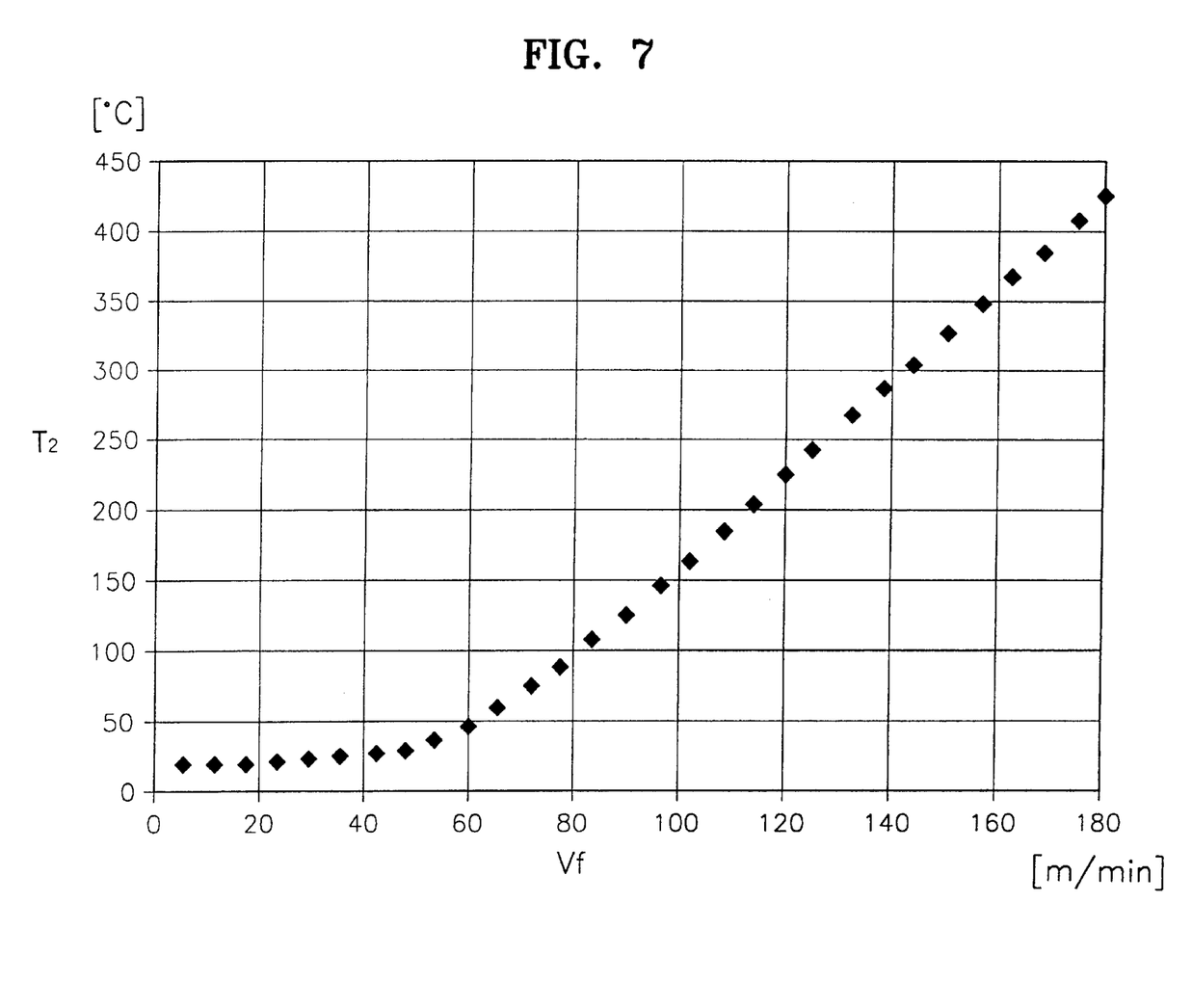
FIG. 7 is a plot showing the temperature of the optical fiber at the position b of FIG. 6 as a function of drawing speed.
Figure 8:
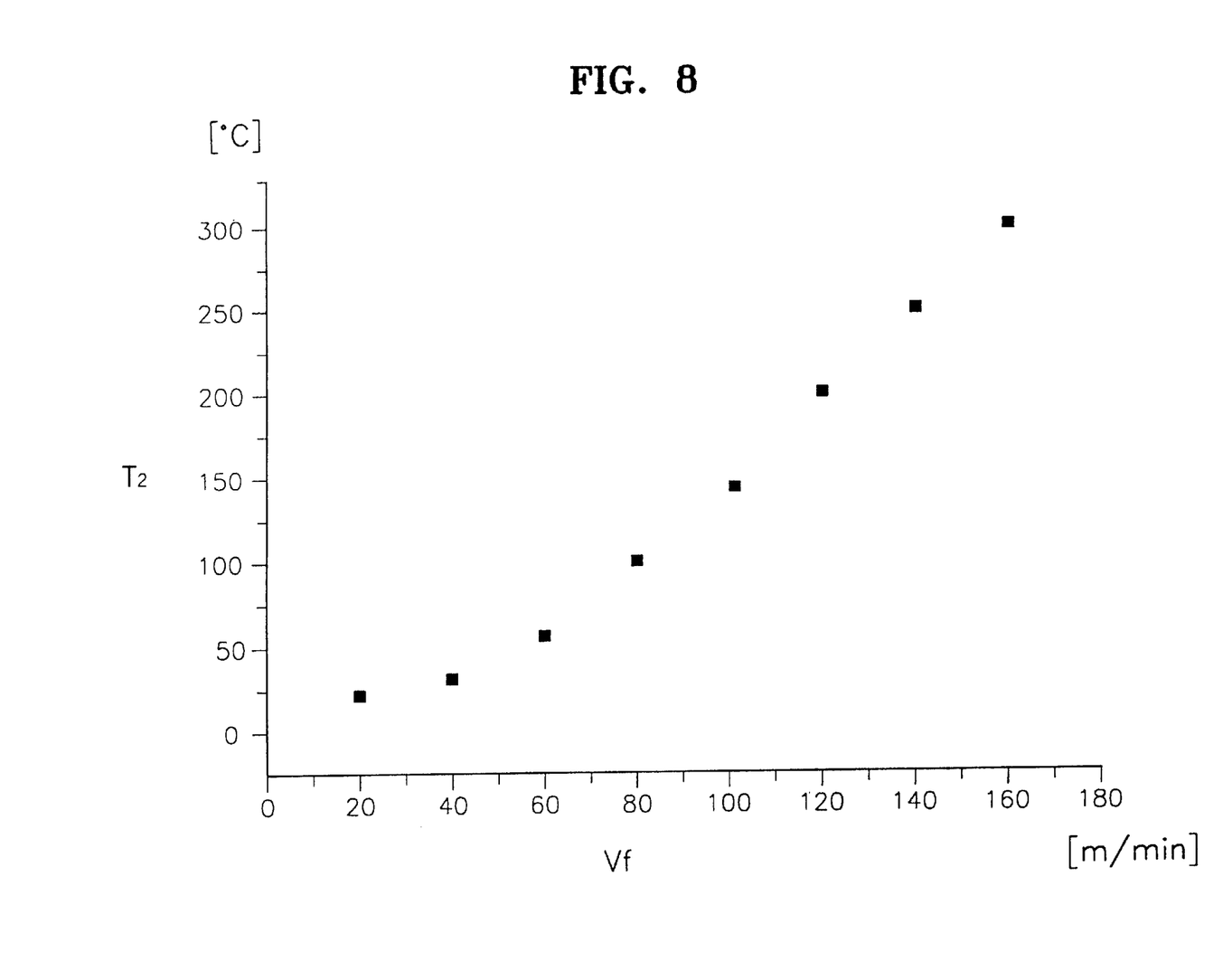
FIG. 8 is a plot showing the temperature of the optical fiber at the position c of FIG. 6 as a function of drawing speed.
Figure 9:
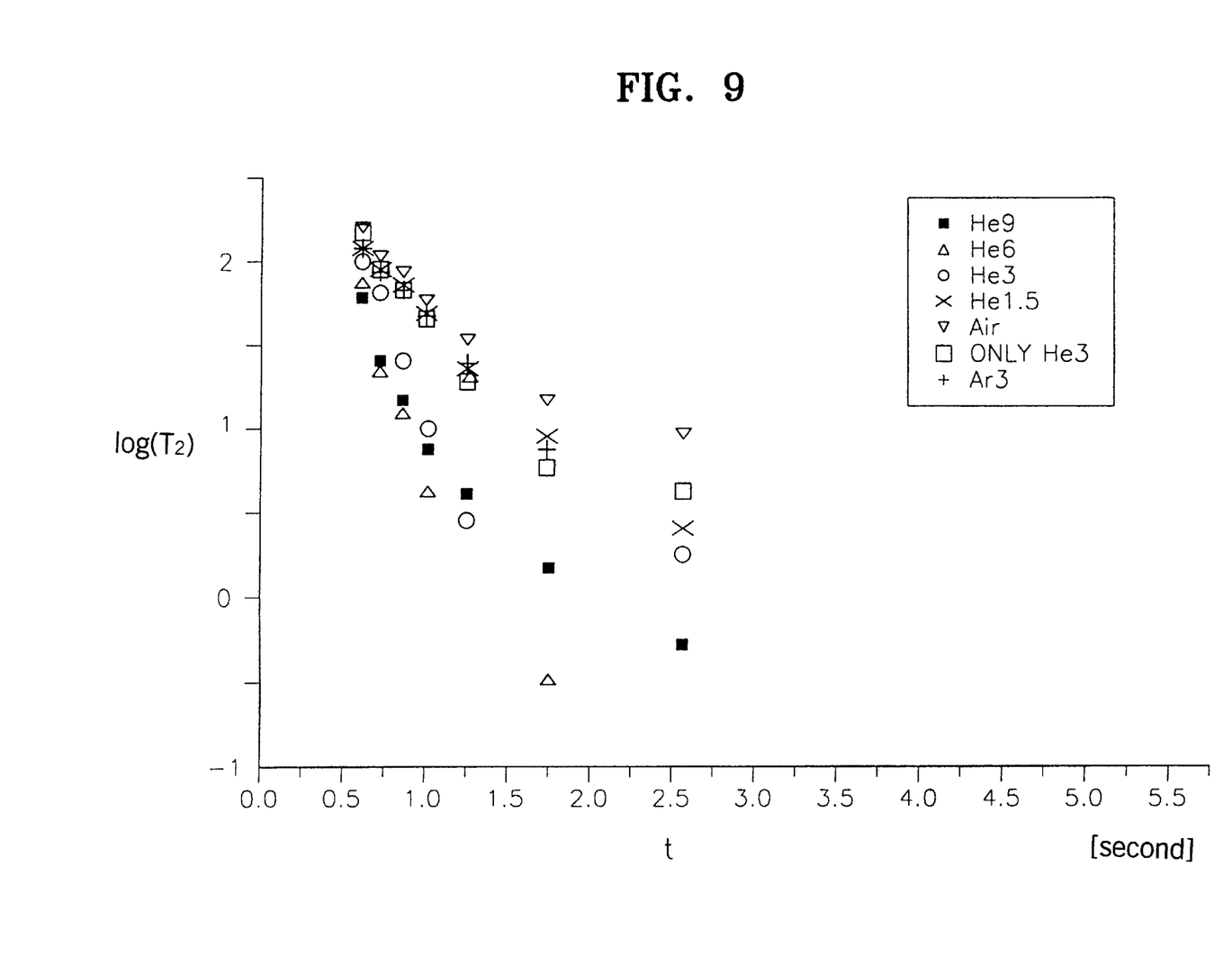
FIG. 9 is a plot illustrating change in temperature of the optical fiber according to the period of time t which is required for the preform of the position a to be drawn as an optical fiber to reach the position c.

FIG. 7 is a plot showing the temperature $T_1$, of the drawn optical fiber at the position b of FIG. 6 according a drawing speed Vf. FIG. 8 is a plot showing the temperature $T_2$ of the drawn optical fiber at the position c of FIG. 6 according the drawing speed Vf FIG. 9 is a plot illustrating the change in temperature as given by $\log(T_2)$ of the optical fiber according to the time t required for the preform of position a to be drawn as an optical fiber to reach position c. Here, the time t is calculated by $$\frac{L}{Vf},$$

wherein L, the distance between positions a and c. is 200 cm. In the legend of FIG. 9, "He9", "He6", "He3" and "Hel.5" indicate the cases when He as a coolant flows through the cooler at a flowing rate of 9,6,3 and 1.5 liters per minute, respectively, while the cooler adopting only the TEC operates. "Air" indicates the case where the cooler is not operated and no coolant is provided, "ONLY He3" indicates the case where only He is supplied at a flowing rate of 3 liters per minute while the operation of the cooler is stopped, and "Ar3" indicates the case where Ar is supplied as the coolant at a flowing rate of 3 liters per minute while the cooler is operated.

As described above, the cooler of an optical fiber draw tower according to the present invention can enhance the cooling effect. Thus, the optical fiber drawing speed can be increased without increasing the height of the optical fiber draw tower. While the present invention has been illustrated and described with reference to specific embodiments, further modifications and alterations within the spirit and scope of this invention as defined by the appended claims will occur to those skilled in the art.

What is claimed is:

1. A cooler for an optical fiber draw tower, comprising:
  a heat exchanger shaped to surround a space for an optical fiber being drawn by a draw tower; and
  a thermoelectric cooling unit mounted in the heat exchanger with the heat-absorbing face of the thermoelectric cooling unit toward said space for an optical fiber being drawn, for transferring heat in response to electrical power.

2. The cooler of claim 1, further comprising:
  a supply pipe and a return pipe in the heat exchanger for supplying a heat-exchange liquid for drawing heat from the heat-emitting surface of the thermoelectric cooling unit.

3. The cooler of claim 1, further comprising:
  a tank in contact with the heat-emitting side of the thermoelectric cooling unit, said tank for holding a heat-exchange liquid.

4. The cooler of claim 3, further comprising:
  a supply pipe and a return pipe attached to the tank for providing a flow of heat-exchange liquid through the tank.

5. A cooler for an optical fiber draw tower, comprising:
  a heat exchanger shaped to surround a space for an optical fiber being drawn by a draw tower; and
  two thermoelectric cooling units mounted in the heat exchanger with the heat-absorbing surfaces of the thermoelectric cooling units toward said space for an optical fiber being drawn, for transferring heat in response to electrical power.

6. The cooler of claim 5, further comprising:

a supply pipe and a return pipe in the heat exchanger for supplying a heat-exchange liquid to draw heat from the heat-emitting surfaces of the thermoelectric cooling units.

7. The cooler of claim 5, further comprising:

a tank in contact with the heat-emitting surfaces of the thermoelectric cooling unit, said tank for holding a heat-exchange liquid.

8. The cooler of claim 7, further comprising:

a supply pipe and a return pipe attached to the tank for providing a flow of heat-exchange liquid through the tank.

9. The cooler of claim 8, further comprising:

insulating material mounted below the heat exchanger for surrounding an optical fiber being drawn.

10. The cooler of claim 4, where the heat-exchange liquid is water.

11. The cooler of claim 8 where the heat-exchange liquid is water.

12. The cooler of claim 3, further comprising fins mounted on the tank for improving cooling of the tank.

13. The cooler of claim 1, further comprising fins mounted on the heat-absorbing surface of the thermoelectric cooling unit.

14. The cooler of claim 1, further comprising an auxiliary cooling system using a fan for removing heat from the heat-emitting surface of the thermoelectric cooling unit.

15. A cooler for an optical fiber draw tower, comprising:

a modular heat-exchanger, comprising:
two parallel rods;
two thermoelectric cooling units with their heat-absorbing faces facing each other, mounted to said rods spaced apart by the diameter of rods and forming a space through which an optical fiber can pass in parallel to the rods;
a tank for holding a liquid mounted on the heat-emitting face of each thermoelectric cooling unit;
a supply pipe and a return pipe attached to each tank for providing a heat-exchange liquid to the tank.

16. The cooler of claim 15, further comprising:

heat-insulating material mounted below the modular heat exchanger for surrounding the optical fiber.

17. The cooler of claim 16, further comprising:

a second modular heat-exchanger mounted below the insulating material and aligned with the first modular heat-exchanger to surround the optical fiber.

18. The cooler of claim 15, where the heat-exchange liquid is water.

19. The cooler of claim 15, further comprising:

a coolant flowing in the space between the heat-absorbing faces of the thermoelectric cooling units and around the optical fiber.

20. The cooler of claim 19, where the coolant is selected from the group consisting of helium, argon and nitrogen.

21. The cooler of claim 15, further comprising fins on the tank for improving cooling of the tank.

22. The cooler of claim 15, further comprising fins on the heat-absorbing surfaces of the thermoelectric cooling units.

23. An optical fiber draw tower comprising the cooler of claim 1 and further comprising: a furnace for heating an optical fiber preform located above the cooler, for heating a preform to draw an optical fiber for passing through said heat exchanger.

24. An optical fiber draw tower comprising the cooler of claim 6 and further comprising:

a furnace for heating an optical fiber preform located above the cooler, for heating a preform to draw an optical fiber for passing through said heat exchanger.

25. An optical fiber draw tower comprising the cooler of claim 15 and further comprising:

a furnace for heating an optical fiber preform located above the cooler, for heating a preform to draw an optical fiber for passing through said modular heat exchanger.

* * * * *